Aug. 9, 1938.          J. W. SMALL          2,126,584
COFFEEPOT
Filed Jan. 16, 1937
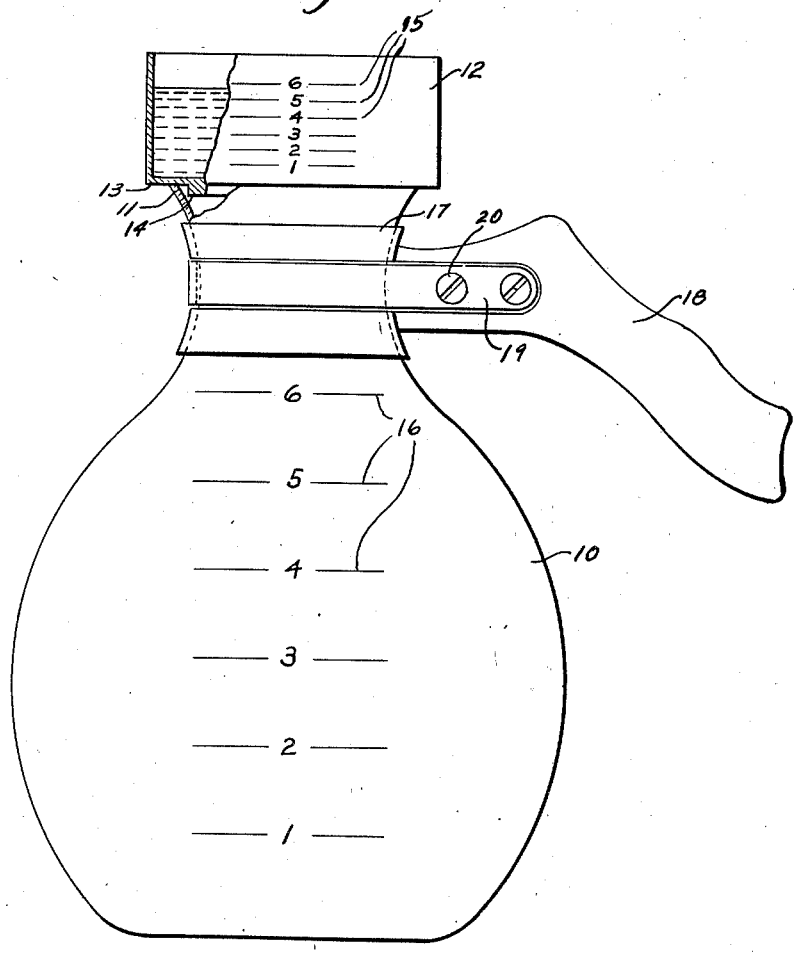
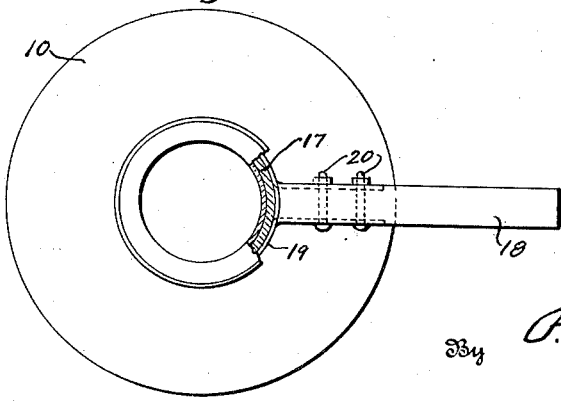
Inventor
James W. Small
By P. John Truscott
Attorney Patented Aug. 9, 1938

2,126,584

UNITED STATES PATENT OFFICE 2,126,584

COFFEEPOT

James W. Small, Chicago, Ill.

Application January 16, 1937, Serial No. 120,926

1 Claim. (Cl. 53—3)

The present invention relates to coffee pots, and particularly to that class of coffee pots in which the coffee is boiled instead of percolated.

One object of this invention is to save the flavor of the coffee, to improve the taste and to economize on the amount of coffee used.

Another object of this invention is to provide means for creating pressure on the coffee being boiled and for producing a cooling effect on the surface of the coffee so as to prevent violent and turbulent boiling and agitation of the coffee.

In carrying out these objects I preferably provide a one-piece coffee pot made of glass having but one outlet at the top, and a condenser or cooling receptacle within said opening to seal the same and act as a safety valve and pressure regulator as well as a means for condensing vapors which normaly escape through the spout of a coffee pot, the condensed vapors dripping back into the coffee.

Another object of this invention is to provide in a condenser of the character described, a means for measuring the coffee which is to be placed in the coffee pot, the condenser also being used for the purpose of mixing the coffee and other ingredients, such as salt and/or eggs which are commonly used to flavor the coffee.

Another object is to construct a coffee pot in a manner which will lend itself readily to known methods of making glassware easily and economically, the construction being such that the parts are symmetrical and easily blown or cast.

Other objects of this invention will appear hereinafter as the description thereof proceeds, the novel features, arrangements and combinations being clearly set forth in the specification and in the claim thereunto appended.

In the drawing:

Fig. 1 is an elevation, partly in section, of a coffee pot with condenser embodying my invention, parts thereof being broken away for the sake of clearness.

Fig. 2 represents a plan view of the coffee pot.

Ordinarily when coffee is boiled, the vapors arising from the coffee carry with them a certain amount of the flavor of the coffee bean, as is readily detected by smelling the vapors as they arise from the coffee pot. Where these vapors are permitted to escape, it is obvious that much of the coffee flavor also escapes, and more coffee is necessary in order to make the same amount of coffee than would be necessary where these flavors are not permitted to escape. Furthermore, the sweeter flavoring portion of the coffee bean which is light enough to be carried off with the vapors is that which should be preserved in the coffee to give it its best taste. Therefore, I provide means for insuring that these vapors will be condensed and returned to the coffee whereby to improve its flavor.

In the drawing 10 represents a coffee pot formed in any desired shape but preferably symmetrical, with an upper lip 11 surrounding the single opening at the top thereof. The coffee pot 10 is preferably made of any of the well-known types of glass which do not crack when placed over an open flame. The lip 11 of the coffee pot 10 has the extreme upper edge in a single plane to form a seat for the condenser.

The condenser 12 is cylindrical and is provided with a lower flat surface or shoulder 13 which rests on the upper edge of the lip 11 to seal the mouth of the coffee pot. On the bottom of the condenser 12 there is formed a reduced cylindrical portion 14 for preventing lateral shifting movement thereof, and this reduced portion 14 is preferably slightly smaller in diameter than the adjacent walls of the neck of the coffee pot 10 when the condenser is in operative position to thereby provide a small amount of clearance between the condenser and the said walls. This insures that the condenser 12 will rest firmly on its seat.

The condenser 12 and coffee pot 10 are each preferably provided with graduations 15 and 16 respectively. These graduations on the condenser 12 indicate the depths to which the receptacle should be filled with coffee grounds for a given number of cups of coffee to be made. In the present instance I have indicated levels for any number of cups from one to six. The coffee pot 10 is similarly graduated with numbers from one to six to indicate the amount of water to be placed within this coffee pot for the given number of cups of coffee to be prepared. Thus if three cups of coffee are to be made, the condenser 12 should be filled with coffee grounds to the level of the mark "3" in the drawing, and the coffee pot 10 should be filled with water to the level of mark "3" thereon. After this has been done, if no other ingredients are to be added to the coffee grounds, the coffee grounds are poured into the coffee pot 10 and the coffee pot is placed over the heating element. If desired, however, other ingredients such as salt, eggs, or the like, may be mixed with the coffee while in the condenser 12 before pouring the mixture into the water in the coffee pot.

The condenser 12 should then be rinsed out and filled with cold water. When the coffee begins to reach the boiling point, the condenser 12 is put in position as indicated on the drawing, and the vapors rising within the coffee pot 10 strike the cold bottom of the condenser, and the vapors are condensed and then drip back into the coffee. The weight of the condenser 12 and the water therein exert a pressure on the coffee being boiled and reduce the boiling point of the same whereby some of the flavor of the coffee is not spoiled by excessively heating the coffee grounds.

The coffee pot 10 is provided with any suitable form of handle such as that illustrated in the drawing in which an insulated sleeve 17 made of rubber or the like is placed about the neck of the coffee pot, and a handle 18 is connected thereto by means of a steel band 19 which surrounds the insulating member 17, and is connected to its opposite end to the handle by means of screws 20.

The neck of the coffee pot preferably has an inner diameter large enough to permit one's hand to be inserted into the coffee pot so that the same may be thoroughly cleaned.

Obviously those skilled in the art to which this invention pertains may make various changes in the arrangement and construction of the parts shown in the drawing without departing from the spirit of this invention, and therefore I do not wish to be limited except as hereinafter set forth in the claim.

Having thus fully described my invention, what I claim and desire to secure by Letters Patent of the United States is:

A coffee pot comprising a receptacle having a large central portion forming a body, a large flat base and a neck at the upper part of the body terminating in a coplanar rim, said receptacle being imperforate save for the opening formed by the neck, and a condenser member adapted to be filled with a condensing fluid comprising a receptacle having an imperforate flat bottom adapted to rest in sealing relation upon the rim of said neck, the bottom of said condenser member being provided with an annular downwardly extending portion spaced inwardly from the periphery of the condenser member to be received loosely within the neck when the condenser member is placed on the rim, said annular portion forming with the bottom of the condenser member a vapor condensing chamber, and said neck being flared outwardly from the line of intersection of the plane of the lower face of said annular portion with said neck when the condenser is resting on the rim to lie outwardly of the arc traced by the outer edge of said annular portion when the condenser member is tilted, while resting on the rim, by the pressure within the receptacle, so as to prevent binding of the condenser member during such tilting.

JAMES W. SMALL.